United States Patent
Rother et al.

(10) Patent No.: US 7,529,429 B2
(45) Date of Patent: May 5, 2009

(54) AUTO COLLAGE

(76) Inventors: Carsten Rother, c/o Microsoft Research Ltd, Roger Needham Building, JJ Thompson Avenue, Cambridge (GB) CB3 0FB; Lucas Bordeaux, c/o Microsoft Research Ltd, Roger Needham Building, JJ Thompson Avenue, Cambridge (GB) CB3 0FB; Youssef Hamadi, c/o Microsoft Research Ltd, Roger Needham Building, JJ Thompson Avenue, Cambridge (GB) CB3 0FB; Andrew Blake, c/o Microsoft Research Ltd, Roger Needham Building, JJ Thompson Avenue, Cambridge (GB) CB3 0FB (*) Notice: Subject to any disclaimer, the term of this patent is extended or adjusted under 35 U.S.C. 154(b) by 318 days.

(21) Appl. No.: 11/552,312

(22) Filed: Oct. 24, 2006

(65) Prior Publication Data

US 2007/0058884 A1    Mar. 15, 2007

Related U.S. Application Data

(63) Continuation-in-part of application No. 11/213,080, filed on Aug. 26, 2005.

(51) Int. Cl.
G06K 9/36 (2006.01)
(52) U.S. Cl. .............. 382/284; 382/294; 382/302; 358/540; 358/450
(58) Field of Classification Search ........... 382/284, 382/294, 302; 358/540, 448, 450
See application file for complete search history.

(56) References Cited

U.S. PATENT DOCUMENTS 5,568,194 A  10/1996  Abe
5,850,352 A * 12/1998  Moezzi et al. ............ 345/419
5,862,508 A    1/1999  Nagaya et al.
5,963,247 A * 10/1999  Banitt ....................... 348/121
6,123,362 A    9/2000  Squilla et al.

(Continued)

FOREIGN PATENT DOCUMENTS

JP     2000043363     2/2000

(Continued)

OTHER PUBLICATIONS

Rother, Carsten et al., "Digital Tapestry", retrieved on Dec. 12, 2006, <<http://research.microsoft.com/~carrot/publications_files/paper_DigitalTapestry_CVPR05.pdf>>, 8 pages.

(Continued)

Primary Examiner—Yosef Kassa
(74) Attorney, Agent, or Firm—Lee & Hayes, PLLC (57) ABSTRACT

It is required to provide an automated process for forming a visually appealing digital collage (also referred to as a tapestry or photomontage) from a plurality of input images. Input images and a collage are labeled. Labels in the collage specify which regions of the input images are used to form those collage regions. An energy function is created for the labeling which contains terms that take into account various criteria to produce a collage. For example, those criteria may relate to the amount of information in the images, similarity of the images, entropy in the images or object class information. A multi-stage optimization process is applied to the energy function which is fast and enables large numbers of input images to be used to produce a collage.

20 Claims, 7 Drawing Sheets

U.S. PATENT DOCUMENTS

| | | | |
|---|---|---|---|
| 6,205,259 B1 * | 3/2001 | Komiya et al. | 382/284 |
| 6,263,088 B1 | 7/2001 | Crabtree et al. | |
| 6,320,976 B1 | 11/2001 | Murthy et al. | |
| 6,392,658 B1 * | 5/2002 | Oura | 345/629 |
| 6,396,963 B2 | 5/2002 | Shaffer et al. | |
| 6,411,742 B1 | 6/2002 | Peterson | |
| 6,663,732 B1 | 12/2003 | Link | |
| 6,717,608 B1 * | 4/2004 | Mancuso et al. | 348/36 |
| 6,798,903 B2 | 9/2004 | Takaoka | |
| 6,850,252 B1 | 2/2005 | Hoffberg | |
| 6,999,095 B2 | 2/2006 | Wang et al. | |
| 7,027,054 B1 | 4/2006 | Cheiky et al. | |
| 7,057,650 B1 | 6/2006 | Sakamoto | |
| 7,058,252 B2 | 6/2006 | Woodgate et al. | |
| 7,085,435 B2 | 8/2006 | Takiguchi et al. | |
| 7,096,426 B1 | 8/2006 | Lin-Hendel | |
| 7,098,914 B1 | 8/2006 | Katayama et al. | |
| 7,181,017 B1 | 2/2007 | Nagel et al. | |
| 7,308,133 B2 | 12/2007 | Gutta et al. | |
| 2003/0095720 A1 | 5/2003 | Chiu et al. | |
| 2004/0161224 A1 | 8/2004 | Yamazoe et al. | |
| 2005/0016244 A1 | 1/2005 | Hergemoller | |
| 2005/0044485 A1 | 2/2005 | Mondry et al. | |
| 2005/0062841 A1 | 3/2005 | Rivera-Cintron | |
| 2006/0061598 A1 | 3/2006 | Mino et al. | |
| 2006/0062455 A1 | 3/2006 | Chiu et al. | |
| 2006/0062456 A1 | 3/2006 | Chiu et al. | |
| 2006/0104542 A1 | 5/2006 | Blake et al. | |
| 2006/0140455 A1 | 6/2006 | Costache et al. | |

FOREIGN PATENT DOCUMENTS

WO    WO2006/079991    8/2006

OTHER PUBLICATIONS

Boykov, et al., "Fast Approximate Energy Minimization via Graph Cuts", pp. 8.

Carson, et al., "Blobworld: Image Segmentation Using Expectation-Maximization And Its Application To Image Querying", pp. 16.

Fitzgibbon, et al., "On Affine Invariant Clustering and Automatic Cast Listing in Movies", pp. 17.

Jojic, et al., "Epitomic Analysis Of Appearance And Shape", at <<http://www.research.microsoft.com/~jojic>>, ICCV, 2003, pp. 10.

Kolmogorov, et al., "Computing Visual Correspondence with Occlusions using Graph Cuts", Computer Science Department Cornell University, pp. 37.

Kolmogorov, et al., "Multi-camera Scene Reconstruction via Graph Cuts", Computer Science Department Cornell University, pp. 16.

Kolmogorov, et al., "What Energy Functions can be Minimized via Graph Cuts?", Computer Science Department Cornell University, pp. 17.

Rother, et al., "AutoCollage", pp. 6.

Swain, et al., "Color Indexing", Kluwer Academic Publishers, 1991, pp. 11-32.

Uyttendaele, et al., "Eliminating Ghosting And Exposure Artifacts In Image Mosaics", pp. 8.

Viola, et al., "Rapid Object Detection Using A Boosted Cascade Of Simple Features", CVPR, 2001, pp. 9.

Zhu, et al., "Filters, Random Field and Maximum Entropy (FRAME): Towards a Unified Theory for Texture Modeling", Kluwer Academic Publishers, 1998, pp. 107-126.

Agarwala, A et al. "Interactive Digital Photomontage", ACM Trans Graph. 23, 3, (2004), pp. 1-9.

Chen, J-Y, "Hierarchical Browsing and Search of Large Image Databases", IEEE Transactions on Image Processing, vol. 9, No. 3, (Mar. 2000), pp. 1-15.

Diakopoulos, N. et al. "Mediating Photo Collage Authoring", UIST 05 (Oct. 2005), pp. 183-186.

Efros, A. A. et al. "Image Quilting for Texture Synthesis and Transfer". Proc. ACM Siggraph, (2001), pp. 341-346.

Gemmell, J et al. "My LifeBits: Fulfilling the Memex Vision", Proceedings ACM Multimedia 2002, 10th International Conference on Multimedia, Juan-les-Pins, France, Dec. 1-6, 2002 ACM International Multimedia Conference New York: ACM, US, vol. conf 10, (Dec. 2002), pp. 1-4.

Gemmell, J et al. "Telling Stories with Mylifebits", Multimedia and Expo 2005, ICME 2005, IEEE International Conference on Amsterdam, The Netherlands (Jul. 2005), pp. 1-4.

iView MediaPro User Manual, iView Multimedia Ltd, London, GB, (Jul. 2002), pp. 1-58.

Krishnamachari, S. "Image Browsing using Hierarchical Clustering", Computers and Communications, 1999. Proceedings IEEE International Symposium on Red Sea, Egypt Jul. 6-8, 1999, Los Alamitos, CA, USA, IEEE Comput. Soc. USA, Jul. 6, 1999, pp. 301-307.

Kwatra, V. et al. "Graphcut Textures: Images and Video Synthesis Using Graph Cuts". ACM Trans Graph. 22, 3, 227-286, (2003), pp. 1-10.

Ma, Y et al. "Video Snapshot: A Bird View of Video Sequence", Multimedia Modelling Conference, 2004, MMM 2005, Proceedings of the 11th International Honolulu, HI, USA, Jan. 12-14, 2005, Piscataway, NJ, USA, IEEE Jan. 12, 2005, pp. 1-8.

Parker, E. "Virtual Reality". WESCON/96 Anaheim, CA, USA, Oct. 22-24, 1996, New York, NY, USA, IEEE, US, Oct. 22, 1996, pp. 542-546.

Perez, P. et al. "Poisson Image Editing". ACM Trans. Graph. 22, 3, 313-318, (2003).

Wang, J. et al. "Picture Collage", Proceedings of the 2006 IEEE Computer Society Conference on Computer Vision and Pattern Recognition, pp. 1-8.

* cited by examiner

AUTO COLLAGE

CROSS-REFERENCE TO RELATED APPLICATION(S)

This application is a continuation-in-part application from U.S. application Ser. No. 11/213,080 filed on 26 Aug. 2005 entitled "Image Tapestry", which is expressly incorporated herein by reference. U.S. patent application Ser. No. 11/213,080 is itself a full utility filing of U.S. provisional application No. 60/627,384 which was filed on 12 Nov. 2004 and which is also expressly incorporated herein by reference.

TECHNICAL FIELD

This description relates generally to image processing for creating digital collage, also known as digital tapestry and photomontage, from a plurality of digital images.

BACKGROUND

It is required to provide an automated process for forming a visually appealing collage from a plurality of input images. This is a difficult problem especially as the number of input images increases and when it is required to produce a collage that acts as a type of visual image summary which is appealing to the viewer.

Manual methods of generating an image tapestry or image collage are known. For example, by manually segmenting and combining a collection of consumer photographs. These photographs may be manually cropped and combined to form a manually generated tapestry such as by using commercial image editing software. However, this is time consuming and requires significant skill and knowledge on the part of the user.

Previous automated approaches have relied on using images to be assembled that are already broadly compatible, by being approximately matched along the seams. Only adjustment of the seams is then required to make the seams invisible. However, it is required to use images that may not already be broadly compatible.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

It is required to provide an automated process for forming a visually appealing digital collage (also referred to as a tapestry or photomontage) from a plurality of input images. Input images and a collage are labeled. Labels in the collage specify which regions of the input images are used to form those collage regions. An energy function is created for the labeling which contains terms that we design to enable us to take into account various criteria we specify to produce a good collage. For example, those criteria may relate to the amount of information in the images, similarity of the images, entropy in the images or object class information. A multi-stage optimization process is applied to the energy function which is fast and enables large numbers of input images to be used to produce a collage.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a system for producing collages from digital photographs, the system described is provided as an example and not a limitation. As those skilled in the art will appreciate, the present examples are suitable for application in a variety of different types of selection and/or labeling systems using any types of digital image such as stills from videos, medical images, UV images, IR images or any other suitable type of image.

It is required to provide an automated process for forming a visually appealing collage (also referred to as a tapestry or photomontage) from a plurality of input images. This is a difficult problem especially as the number of input images increases and where those images differ widely from one another. For example, the plurality of input images may be a collection being a personal data set of about 50 photographs of an event such as a holiday. The photographs may be of different sizes and may be different from one another in that they are not already approximately matched along seams for joining. For example, some of the photographs may be taken at night and some during day light. Others may be of landscapes whereas others may be portraits of people. By forming a collage, a single image is produced which is an amalgam of parts of some or all of the input images. The collage thus acts as a type of visual summary of the input images, for example, to summarize images of a family holiday. It is not essential for the plurality of input images to be related to one another such as by all being from a particular event.

The collage may remind the user of the collection of input images, e.g. as a "thumbnail" of the image collection. In some cases, the collage may act as an image retrieval system. For example, a user may select one or more portions of the collage, and the collage system may retrieve one or more images having similar image characteristics, may retrieve the input image(s) providing the depicted image in the selected region, and the like.

We recognize a variety of problems with previous collage systems that may lead to collages which are less visually appealing. For example, "seams" are often visible where image regions are joined together in the collage. This distracts from the overall effect and is unpleasing. Also, it is often the case that images and/or image regions selected from input images to be incorporated into the final collage are not representative of the input image set, as judged by human viewers. Sometimes, image regions selected to be incorporated into the collage are of an inappropriate relative size and so do not produce a pleasing effect in the collage. Also, sometimes image regions are treated inappropriately, for example, faces may not be preserved whole or sky might appear at the bottom or interior of the collage. In addition, the image regions may be arranged in the collage in an inefficient manner so that the resulting visual summary is not as complete as it might have been. As well as this, computational complexity needs to be taken into account so that the time taken to form collages automatically is reduced where possible.

The present application relates to material which builds upon and extends from our earlier work which is described in U.S. patent application Ser. No. 11/213,080 filed on 26 Aug. 2005 and published as US-2006-0104542-A1 which is incorporated herein by reference. In that earlier patent application we describe a method of creating a digital tapestry from a plurality of different input images by formulating this process as a labeling problem. The labeling problem is modeled using an energy function which is optimized to find possible solutions to the labeling problem which provide collages or tapestries. In that earlier work we describe optimizing that energy function using a single optimization step such as a graph-cut based expansion move algorithm for example.

Figure 1:
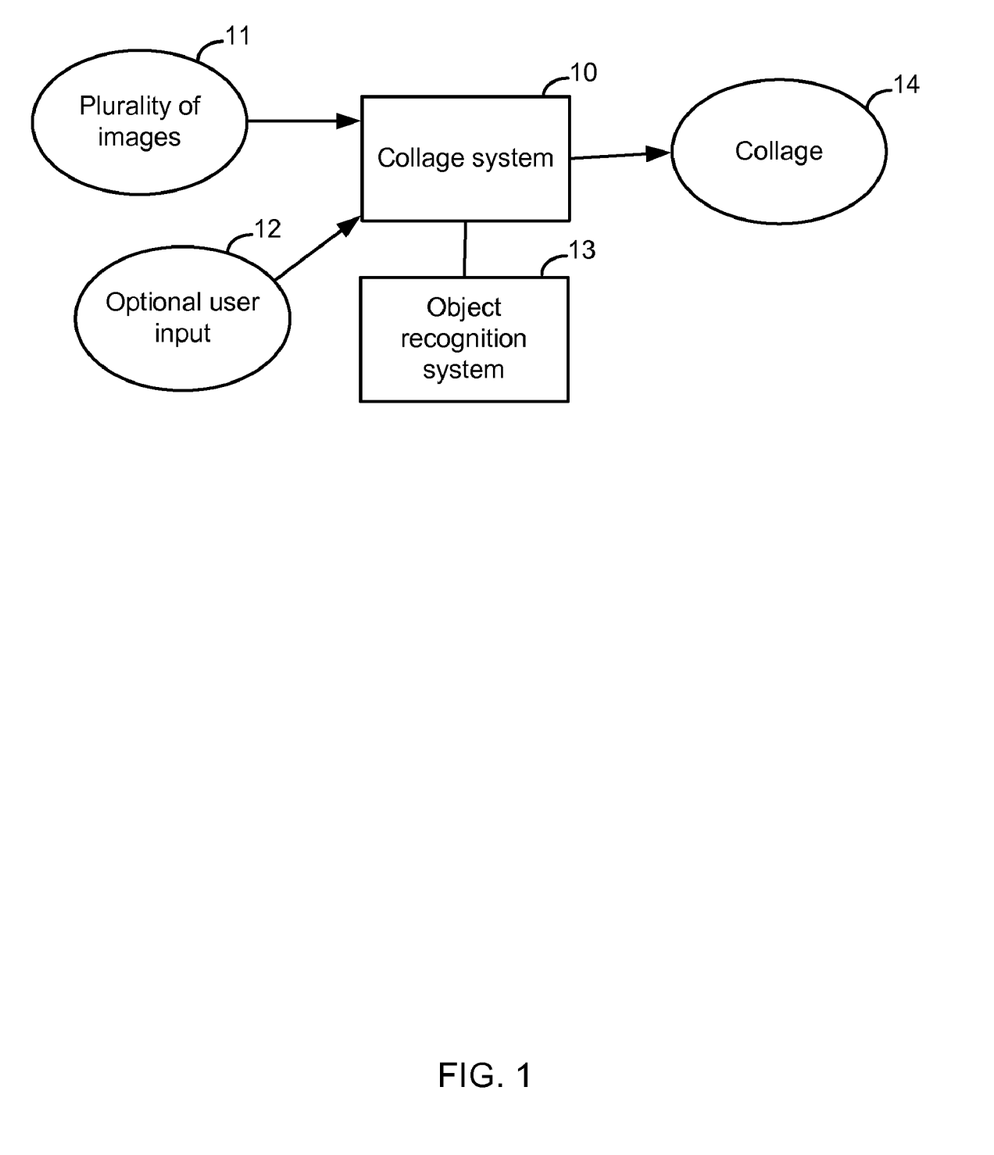
FIG. 1 is a schematic diagram of a collage system.

FIG. 1 is a high level schematic diagram of a collage system 10. This is arranged to take as input a plurality of input images 11 which may be of different sizes and may be different from one another as discussed above. Optionally user input 12 is also provided, for example, to specify preferred images and/or image regions for inclusion in the collage. The collage system is optionally in communication with an object recognition system 13 which is able to automatically process the input images to provide object detection and/or recognition information. The collage system forms a collage 14 and provides this output to a display or storage medium or any other form of output. Not all of the input images are required to be represented in the collage 14.

The collage system and object recognition system are each provided using a computer or other processor of any suitable type. The collage system and object recognition system may be integral or independent of one another provided that they are in communication with each other. The computers or other processors comprise suitable operating system or platform software as known to the skilled person which enables software providing the collage system and object recognition system to be executed. The software providing the collage system and object recognition system is provided using any suitable programming language as known to the skilled person. The collage system has inputs of any suitable type for receiving the input image(s) for example, a DVD drive, CD drive, Ethernet connection, internet connection, USB port, user interface or other input means. The collage system has an output to provide the resulting collages. The output is of any suitable type. For example, a user interface with a display screen, a file store, a memory, a CD writer or any other suitable output.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

Figure 2:
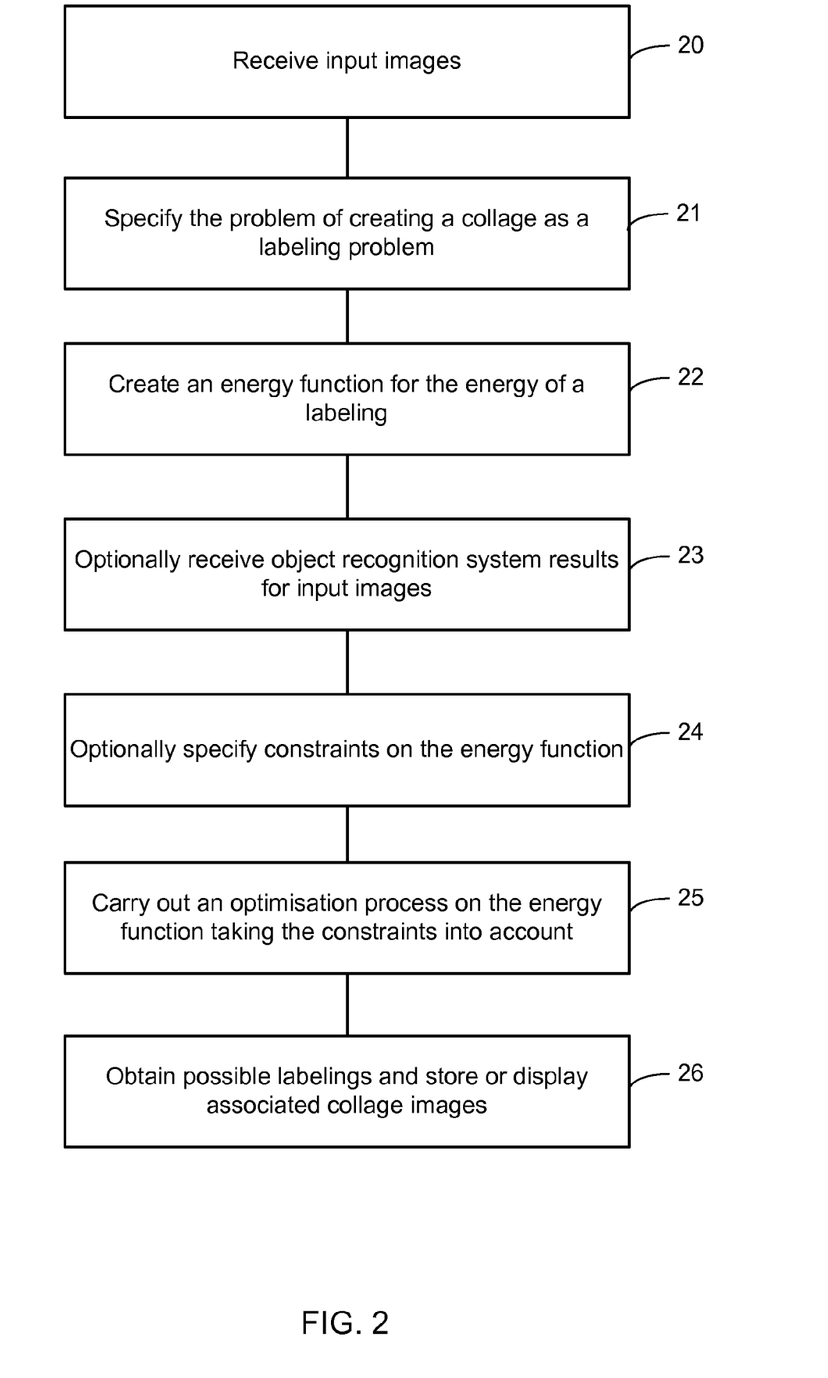
FIG. 2 is a flow diagram of a method of using the collage system of FIG. 1 to create a collage.

FIG. 2 is a flow diagram of a method of using the system of FIG. 1 to automatically produce a collage from one or more input images. The input images are received (box 20). As mentioned above we characterize the process of automatically forming the collage as a labeling problem (box 21). Labels in the collage specify which regions of the input images are used to form those collage regions. There are a huge number of possible labelings each corresponding to a different potential collage. Our task is to find an optimal labeling in terms of criteria we specify so that the resulting collage is pleasing, informative and a good summary of the input images. More detail about example labeling systems that may be used are given below.

We create an energy function for the energy of a labeling (box 22) which contains various terms that we tailor or design to enable us to take into account various criteria we specify to produce a good collage. More detail about the energy function is given below. The energy function has various parameters or weights that are specified as part of creating the energy function. The parameters or weights influence the degree to which the different criteria are taken into account. Optionally we receive object recognition system results for the input images (box 23) and use this information, either in the energy function itself as part of the parameters or during an optional constraint specification process (box 24). We specify one or more constraints on the energy function which may for example, enable computational complexity to be reduced or may act to enable better collages to be produced. More detail about example constraints is given below.

An optimization process is carried out on the energy function taking any specified constraints into account (see box 25). Any suitable optimization process may be used and examples are given below. The optimization process finds maxima or minima (or local maxima or local minima) of the energy function which are possible labelings. Each possible labeling corresponds to a collage. One or more of these collages are stored or displayed (box 26).

Labeling

More detail about the process of specifying the problem is now given. The input to AutoCollage is a set of input images $I=\{I_n, \ldots, I_N\}$. In order to standardize the input, a pre-processing step is assumed to have been applied, so that each image $I_n$ is scaled to have unit area, while preserving the aspect ratios of individual images. As mentioned above, creation of a collage is viewed as a labeling problem, described using the following notation. The collage is itself an image I, defined over a domain P, and each pixel-location $p \in P$ of the collage is to be assigned a label $L(p)$, by the AutoCollage algorithm. The labeling $L=\{L(p), p \in P\}$ completely specifies the collage, as follows. An individual label has the form $L(p)=(n,s)$ in which $I_n \in I$ is the input image from which the collage pixel p is taken, and $s \in S$ is the pixel-wise 2D shift of the input image n with respect to the collage, so that $I(p)=I_n(p-s)$. We will often write this compactly as $I(p)=S(p,L(p))$, in which $S(\ldots)$ is defined by $S(p,(n,s))=I_n(p-s)$ and normalized as $S(\ldots) \in [0,1] \times [0,1] \times [0,1]$.

We seek to find the best labeling $L \in \mathcal{L}$, in the space $\mathcal{L}$ of possible labelings. This is expressed as finding the labeling L which minimizes an energy or cost $E(L)$, to be defined in detail below. We use an optimization procedure is defined that searches efficiently in the space of allowed labelings, to obtain a labeling with low energy but, since the algorithm is approximate, not necessarily the global minimum. Note that, by comparison, in earlier work by others, where all input images were pre-aligned, each pixel-label consisted of an image index alone, without any shift variable s. In the present case, the optimization problem is more complex, because it is necessary to search not only over image indices n=1, ..., N, at each pixel, but also over allowed shifts s.

Collage Energy

The process of creating the energy function for the labeling L is now described in more detail with reference to FIG. 3. This comprises adding together one or more energy terms each of which is designed or tailored by us to specify criteria or characteristics that are required in order to produce a good labeling (or collage).

In a particular example, the energy function comprises four terms as given below. However, this is not essential. It is also possible to use any one or more of these terms or to use other energy terms as appropriate.

The energy of a labeling L comprises four terms, as follows:

$$E(L)=E_{rep}(L)+w_{imp}E_{imp}(L)+w_{trans}E_{trans}(L)+w_{obj}E_{obj}(L) \quad (1)$$

The first term $E_{rep}$ tends to select the images from the input image set that are most representative, in two senses: first that chosen images are texturally "interesting" and second that they are mutually distinct. For instance this may have the effect that near duplicates will not be selected. The $E_{imp}$ term ensures that a substantial and interesting region of interest (ROI) is selected from each image in I. Next, $E_{trans}$ is a pairwise term which penalizes any transition between images that is not visually appealing. Finally, $E_{obj}$ incorporates information on object recognition, and favors placement of objects in reasonable configurations (faces preserved whole, sky at the top, in our implementation). In the remainder of the section, each of these energy terms is defined in detail, together with constraints that must be maintained.

Examples of the energy term $E_{rep}$ are now given.

Figure 3:
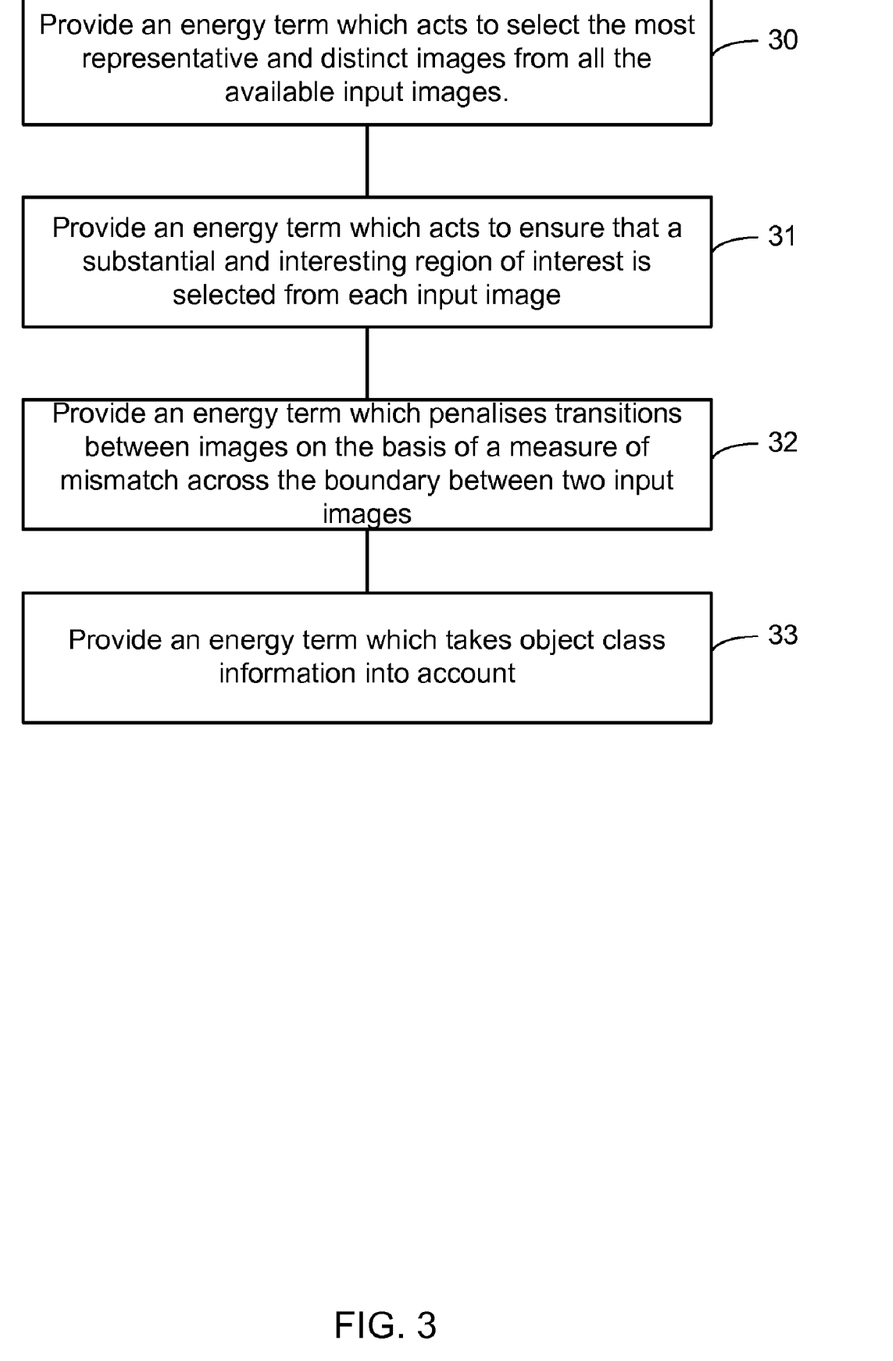
FIG. 3 is a flow diagram of a method of creating an energy function for use in creating a collage.

A first possible energy term acts to select one or more input images from the collection of input images made available (box 30, FIG. 3). For example, we select only the most interesting of the input images and not for example, those which are blank or contain little detail. In addition, we may select distinct images.

For example, we provide an energy term which acts to select the most representative and distinct images from the set of available input images (30, of FIG. 3). For example, the most texturally informative input images from all the available input images are selected. We may select images on the basis of a measure of the amount of information in the images. Optionally, we may also select on the basis of information about whether the image contains an image of a particular class of object, such as a face, person, building, car or other specified class of object using information provided by the object recognition system.

In order to reject images which are very similar we may use any suitable indicator of the similarity of images, such as color histograms, correlation indicators or any other suitable measure. In this way we reduce duplication of material in the collage.

In a particular example, the cost associated with the set I of chosen images is of the form $E_{rep}=\Sigma_n E_{rep}(n)$ where $$E_{rep}(n) = -a_n D_r(n) - \min_{ml_m \in \mathcal{P}} a_n a_m V_I(n, m) \quad (2)$$

and $a_n$ is an auxiliary, indicator variable, taking the value 1 if the image $I_n$ is present in the collage and 0 otherwise:

$a_n=1$ if $\exists p \in \mathcal{P}$ with L(p)=(n,s).

The unary term $D_r(n)$ is a measure of the information in image n. The information measure is defined by $$D_r(n)+\text{Entropy}(I_n)+w_{face}\delta(\{\text{Image n contains a face}\}) \quad (3)$$

Where $\delta(\pi)=1$ if predicate $\pi$ is true, and $w_{face}$ weights the influence of an image containing a face, relative to the general textural information in the image. The histogram used to compute entropy for a given image is constructed in two-dimensional a,b space from the L,a,b color system, and discretized into 16×16 bins.

The second term in (2) is expressed in terms of pairwise distances a,b between images, and sums the distances from each image to its nearest neighbor in the set I. As a distance measure $V_r \in [0,1]$ we are using normalized chi-squared distance between the color histograms of a pair of images. The histograms are constructed in a,b space, as above. As well as favoring the most representative images, this energy encourages the use of as many images as possible.

Figure 5:
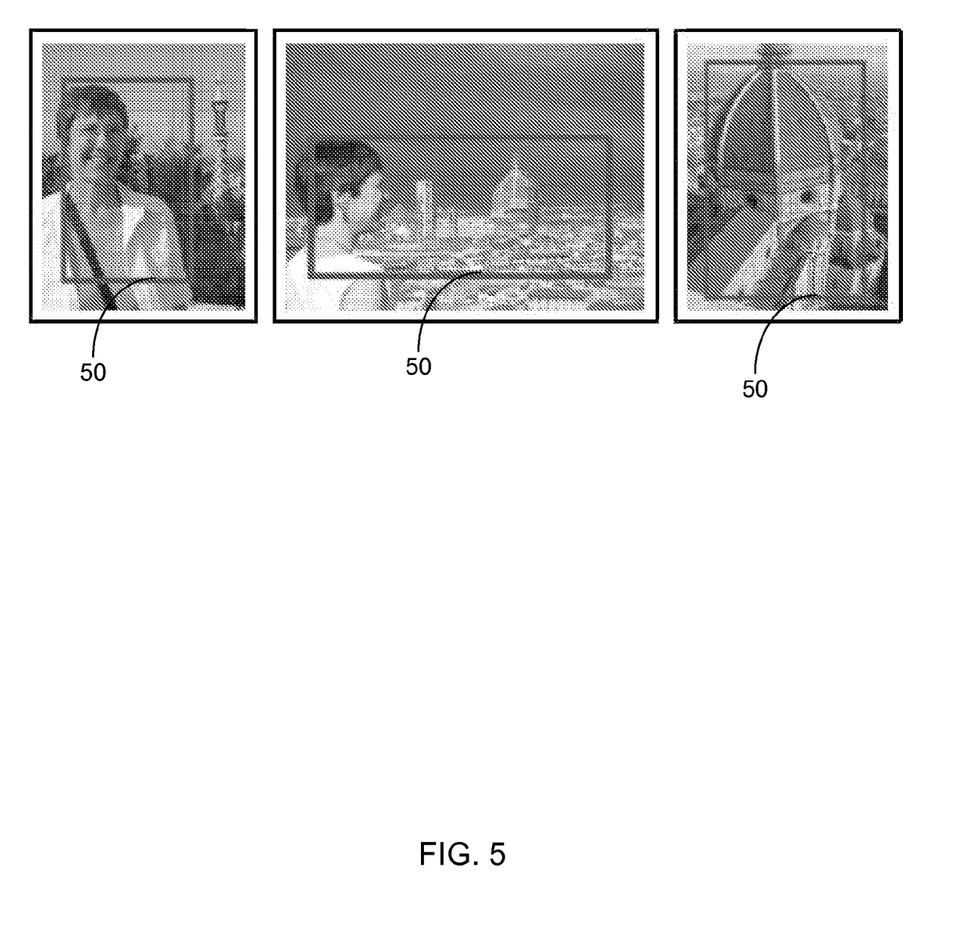
FIG. 5 shows three examples of region of interest selection.

Another possible energy term may be provided which acts to ensure that a substantial and interesting region of interest is selected from each image (box 31). For example, this energy term takes into account a local entropy measure of a specified region around a pixel in an input image. This local entropy measure is an example of a possible indicator of saliency of the image region. Other saliency indicators may be used instead. For example, the saliency model of Itti, L. Koch, C., and Niebur, E. 1998, "A model of saliency based visual attention for rapid scene analysis. IEEE Trans. on Pattern Analysis and Machine Intelligence 20, 11. Optionally, this energy term is weighted such that the centre of an input image is favored for the region of interest. However, this is not essential. By using this energy term it is possible to reduce the likelihood that small, visually meaningless image fragments will occur in the collage. FIG. 5 shows three input images with regions of interest 50 selected for each. It can be seen that highly textured areas, including all faces and central positioning is favored.

This "region of interest" energy term, also referred to as an importance cost energy term is now described in detail for a particular example. The importance cost consists of a unary term of the form:

$$E_{imp}(L) = -\sum_p E_{imp}(p, L(p)) \quad (4)$$

The function $E_{imp}(p,L(p))=G(p,L(p))T(p,L(p))$, where T(p,L(p)) measures the local entropy, in ab coordinates, of a (32×32 pixel) region around the pixel p, and normalized so that local entropy sums to 1 over a given input image. The Gaussian weighting function G( . . . ) favors the centre of the input image from which p is drawn.

Another possible energy term penalizes transitions between images on the basis of a measure of mismatch across the boundary between two input images (box 32). For example, this energy term is also tailored to encourage transitions on a high contrast boundary in either input image. In a particular example, such an energy term is referred to as a transition cost and is described in detail below:

An example transition cost is of the form $E_{trans}=\Sigma_{p,q\in N}V_T(p,q,L(p),L(q))$ where N is the set of all pairs of neighboring (8-neighborhood) pixels. We define the term V as:

$$V_T(p, q, L(p), L(q)) = \min\left(\frac{\|S(q, L(p)) - S(q, L(q))\|}{\varepsilon + \|S(p, L(p)) - S(q, L(p))\|}, \frac{\|S(p, L(p)) - S(p, L(q))\|}{\varepsilon + \|S(p, L(q)) - S(q, L(q))\|}\right) \quad (5)$$

where intensity function $S(\ldots)$ is as defined above, $\varepsilon=0.001$ prevents underflow, and $\|\cdot\|$ defines the Euclidean norm.

In total, $E_{trans}$ measures mismatch across the boundary between two input images. To see this, first observe that $V_T(p,q,L(p),L(q))=0$ unless $L(p)\neq L(q)$. Then note that $V_T(p,q,L(p),L(q))=0$ is small if there is a strong gradient in one of the input images, since the relevant denominator will then be large. The min operation is used because adjacent images in this problem are typically taken from rather different scenes, which often do not match. Our choice of energy then acts appropriately in encouraging transition on a high contrast boundary in either scene, in addition to the usual effect of encouraging a good match across the boundary.

Another possible energy term enables information from an object recognition system to be taken into account (box 33, FIG. 3). For example, object classes are identified for one or more objects depicted in the input images and this information is used to influence creation of the collage (see box 34). In one example, faces are detected and the energy term tailored such that, if a face is included in the collage, it tends to be included as a whole. In another example, if sky regions are detected, these tend to be included only towards the top of the collage.

In one particular example, we have the energy term $E_{obj}=\Sigma_{p,q\in N}f(p,q,L(p),L(q))$, where $f(p,q,L(p), L(q))=\infty$ whenever $L(p)\neq L(q)$ and p,q are pixels from the same face in either the images of L(p) or L(q), 0 otherwise. For sky rather than defining an explicit energy, we simply label images containing sky and pass this information to a constraint satisfaction engine which attempts to position such images only at the top of the collage.

As explained with reference to FIG. 2 parameters are specified for the energy function. These parameters may be specified by hand or may be determined by using an adjustment process together with informal testing of the system. For example, in one embodiment the following parameter values are used although it is noted that these parameter values may be varied substantially whilst still providing workable results. For example, we take $w_{imp}=10.0$, $w_{trans}=1.0$, $w_{obj}=1.0$, $w_{face}=0.01$.

As explained with reference to FIG. 2 constraints on optimization of the energy function are optionally specified. By specifying constraints in this way we may improve the quality of the collages produced and may also reduce computational complexity.

A first constraint relates to the amount of information contained in the regions of interest relative to the whole image from which that region of interest is taken. For example, this constraint is used to guard against the possibility that only a small and unrecognizable fragment of an input image may be selected and used in the collage. The amount of information (either absolute or relative) contained in a region of interest must be above a specified threshold for example. In a particular example, the region of interest must capture at least 90% of the associated input image information. However, any suitable threshold may be used.

In a particular example of this first constraint, referred to as an information bound constraint, any image $I_n$ that is present in the labeling, i.e. for which $L(p)=(n,s)$ for some s and some $p\in P$ must satisfy $$E_{imp}(L,n)>T, \quad (6)$$

where $E_{imp}(L,n)\in[0.1]$ is the proportion of local image information $\Sigma_p E_{imp}(p,L(p))$, that is captured in the ROI. In an example we set $T=0.9$—i.e. so that at least 90% of the image information is captured.

Another optional constraint is referred to herein as a uniform shift constraint. This specifies that a given input image may appear in the collage with only one unique 2D shift (of the input image with respect to the collage). For example, a given input image $I_n$ may appear in the collage with only one unique shift s. i.e. given two distinct pixels $p,q\in P$: $p\neq q$, with labels $L(p)=(n,s),L(q)=(n,s')$, it is required that $s=s'$. This constraint is useful partly for computational efficiency, and partly to ensure that the structure of input images is preserved, without introducing warps.

Another optional constraint is referred to herein as a connectivity constraint. It specifies relative position criteria that collage pixels drawn from the same input image should preferably, but not essentially, meet. For example, each set $S_n\in\{p\in P: L(p)=(n,s),$ for some $s\}$ of collage pixels drawn from image n, should form a 4-connected region. This is encouraged during optimization.

Another constraint is that all or a specified proportion of all pixels in the collage must be labeled, i.e. we do not want to have too many unlabelled pixels since these would give us a blank region in the collage which is visually not appealing.

Figure 4:
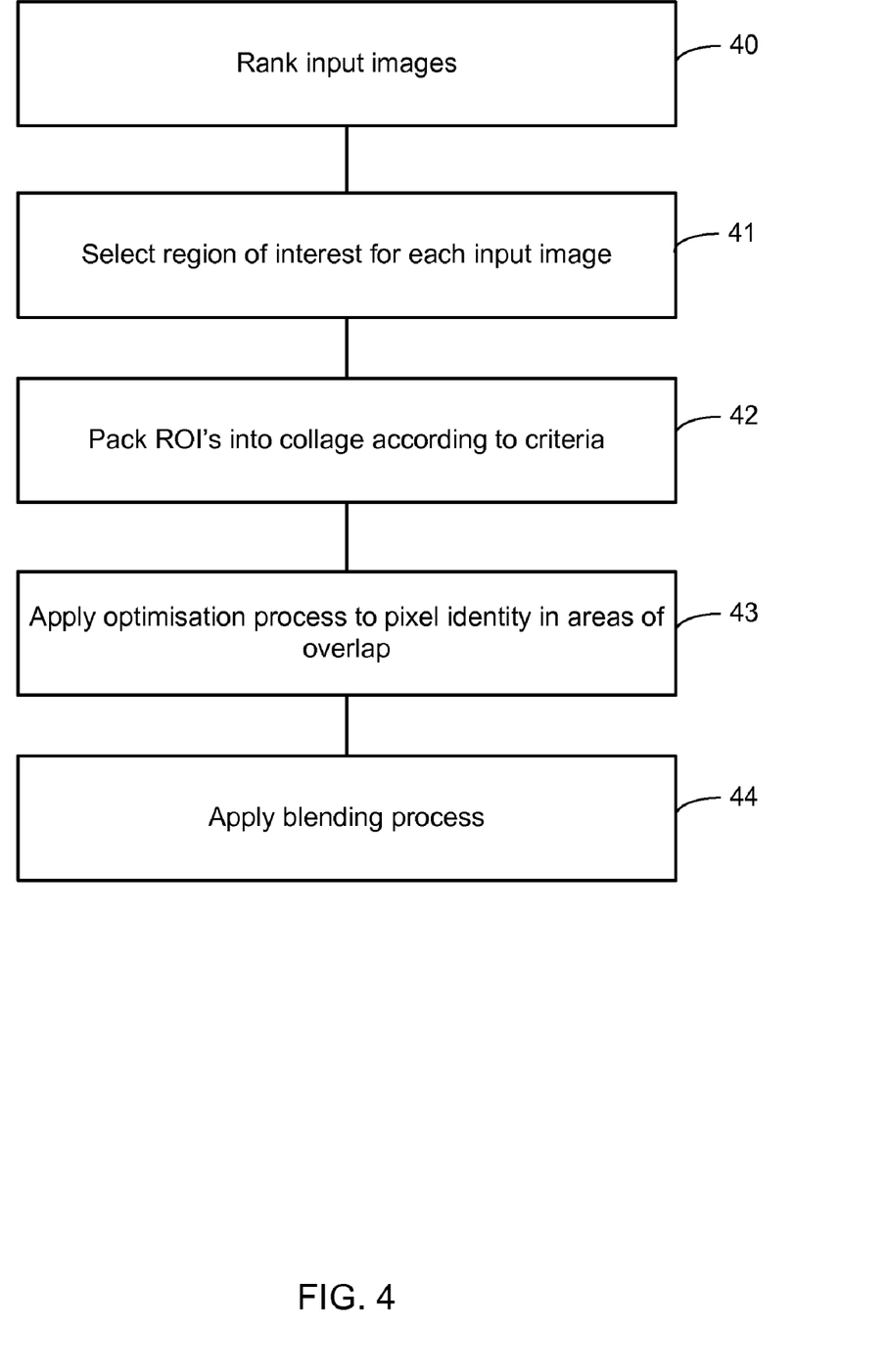
FIG. 4 is a flow diagram of an optimization process.

As mentioned with reference to FIG. 2 an optimization process is carried out on the energy function, taking any specified constraints into account. In one embodiment a single stage graph-cut optimization process is used as described in our earlier patent documents referenced above. In another group of embodiments a heuristic approach is used in which the various aspects of the labeling are optimized independently or in separate optimization stages (either in parallel or in series as discussed in more detail below). By using a multi-stage optimization process in this way we are able to tackle computational complexity and to provide a system that is fast and scalable for large input image sets, such as 50 or more input images. FIG. 4 illustrates four optimization stages according to one example.

The input images are ranked statically during a ranking process 40 on the basis of how much information they contain and rejecting near duplicates. This is done using the energy term described with reference to box 30 of FIG. 3 also referred to as the $E_{rep}$ energy term. Regions of interest are selected for each input image (box 41) and minimized according to specified constraints. For example, the regions of interest are rectangular (where rectangular includes squares) or of any other specified shape. The constraints may be for example the information bound constraint mentioned above and the requirement that all detected faces be included. By using an explicit region of interest selection process we are able to produce good quality collages even where the input images are very different in terms of textural and information content. The steps of ranking the input images and of selecting the regions of interest may be carried out in series or in parallel.

A packing problem is then solved (box 42) to assemble and position as many images with highest rank, into the area allowed for the collage, without allowing regions of interest to overlap. Also, no pixels in the collage should be left blank although this requirement is not mandatory. An optimization process (box 43) is then used to fix pixel identity in the collage in areas of overlap of two or more images. Any suitable optimization process may be used such as a graph-cut optimization as described below. Other examples of suitable optimization processes include but are not limited to: belief propagation, simulated annealing, ICM and TRW.

Each of these four optimization steps is now described in more detail with reference to a particular example.

Image ranking. The ranking step, in the sequence of optimizations, addresses the $E_{rep}$ term in the collage energy (1). First images $I_n$ are relabeled, so that the index n ranks them according to how representative the subset $I_1, \ldots, I_n$ is. This is straightforward since $E_{rep}(n)$ is simply a static rank computed independently in terms of the $n^{th}$ image and its predecessors of higher rank. Thus the $n^{th}$ image is selected greedily as the one that minimizes $$-a_n D_r(n) - \min_{m<n} a_n a_m V_r(n,m),$$

adapting the term $E_{rep}(n)$ (2). The resulting ranking is then passed to the constraint satisfaction step below.

Region of Interest (ROI) optimization. The ROI for each input image $I_n$ is fixed by minimizing, independently for each image, the area of the ROI subject to meeting the information-bound constraint (6), and the constraint that all detected faces are included. This is achieved by constructing a summed area table such as described in Crow, F. 1984 "Summoned area tables for texture mapping", in Proc. ACM Siggraph, ACM, 207-212, for rapid lookup of the total information $\Sigma_{p \in R} E_{imp}(p, L(p))$ in any rectangular ROI R. All rectangles are then enumerated, and checked for satisfaction of the constraint, in order to select the one with minimum area. This operation is quadratic in the number of pixels in $I_n$, and this is mitigated by subsampling. This is done under the constraint that all detected faces are included. FIG. 5 illustrates the effectiveness for this procedure in selecting a ROI.

Constraint satisfaction. Here, the packing sub-problem can be stated as follows. We are given a set of selected images and their ROIs, together with the ranking computed above. The goal is to incorporate as many highly ranked images as possible within the width and height of the collage, while respecting the additional constraint that every pixel be covered by some image (though not necessarily covered by some ROI).

This packing problem is unusual because of the simultaneous presence of constraints for nonoverlapping—no two ROIs should intersect—and covering—every pixel is covered by an image, though not necessarily by a ROI. The general approach is to model the problem as a set of constraints (inequalities, Boolean and linear expressions) between a set of variables, then to solve these constraints by applying constraint satisfaction techniques. We first describe one way to model the problem using constraints (several variants can alternatively be considered). In this problem, the set of variables is $$\mathscr{V} = \{(x_n, y_n, b_n), n=1, \ldots, N\}, \quad (7)$$

the positions $(x_n, y_n)$ for each images and a boolean flag $b_n$ indicating whether the image is to be included or not.

To express the fact that ROIs do not intersect (nonoverlapping), constraints are applied pairwise to images; a typical constraint would be:

$$\text{if } b_n \text{ and } b_m \text{ then } \pi_1 \text{ or } \pi_2, \ldots, \quad (b)$$

where a typical proposition is $\pi_1 = (x_n - x_m > w_m + w_n)$, in which $w_m$ and $w_n$ are respectively the half-widths of the ROIs. Because the relative positions of a ROI pair may be switched, these constraints appear in disjunctive sets.

To express the fact that every pixel of the collage fall under the surface of at least one image (covering), constraints are imposed on every pixel; a typical constraint would be:

$$|i-x_n| \leq W_n \wedge |j-y_n| \leq H_n$$

In which $W_n$ and $H_n$ are respectively the half-width and half-height of image n. This constraint imposes that pixel (i, j) be covered by the $n^{th}$ image. For example, disjunction of such constraints is imposed for every pixel, modeling the requirement that each of them is covered by (at least) one of the images.

Further object-sensitive constraints can be included—for instance we may insist that images with sky appear only at the top of the collage.

Problems involving Boolean combinations of constraints are amenable to approaches based on constraint programming (CP). For example, to obtain good solutions efficiently, we use a two-step approach now described: the first step (branch and bound) solves the problem by only taking into account the constraints of non-overlapping on the ROIs; then the second step (local search) corrects the solution in order to respect the covering constraints.

1. Branch and bound The framework for the first optimization step is a depth-first search which aims at maximizing the number of selected images and their quality (Eq. (2)). Constraint propagation as described in Waltz, D, 1975 "Understanding line drawings of scenes with shadows", in the Psychology of Vision, W.P.H., Ed McGraw-Hill, New York, is applied to subtrees, from which the subtree may either be pruned, or have its search space reduced. Real variables (xn,yn) are dealt with by coarse discretization with conservative truncation of constraints. The issue of switching the set of active constraints from propagation is dealt with by reification as defined in Marriott, K and Stuckey, P, 1998, "Programming with Constraints", The MIT Press. In the branch and bound step, no account is taken of the covering requirement. At this stage we simply solve the problem of packing as many rectangles as possible, within the disjunctive constraints on overlap of ROIs. Even with coarse discretization, the branching factor at a node is large. This is dealt with by randomly selecting a limited number of branches to explore, and by allowing, for each of them, a bounded number of backtracking steps.

2. Local search Once branch and bound has terminated, the resulting packing satisfies the non-overlap constraints between ROIs, but in general will not satisfy the covering constraint. At this point, a local search is applied in order to repair the solution. Perturbations are applied only to $(x_n, y_n)$, not to $b_n$, so the set of selected images is fixed during this step. The effect of this step is to move the images whenever this move increases the coverage, which can be done by any deterministic or randomized local search algorithm.

To make sure that a solution which satisfies both the non-overlapping and covering constraints is systematically found, we repeat steps 1) and 2) several times if necessary, and each time relax slightly the constraints (propositions $\pi_i$ in Eq. 8). The constraint satisfaction step can generate multiple solutions. After refinement in step 2, these multiple solutions can be evaluated using a bound on the energy function (Eq. 1) or given directly to graph cut optimization. (A bound is needed because strictly the energy function itself is only defined for single coverings of pixels, not multiple coverings as delivered by constraint satisfaction.)

Figure 6:
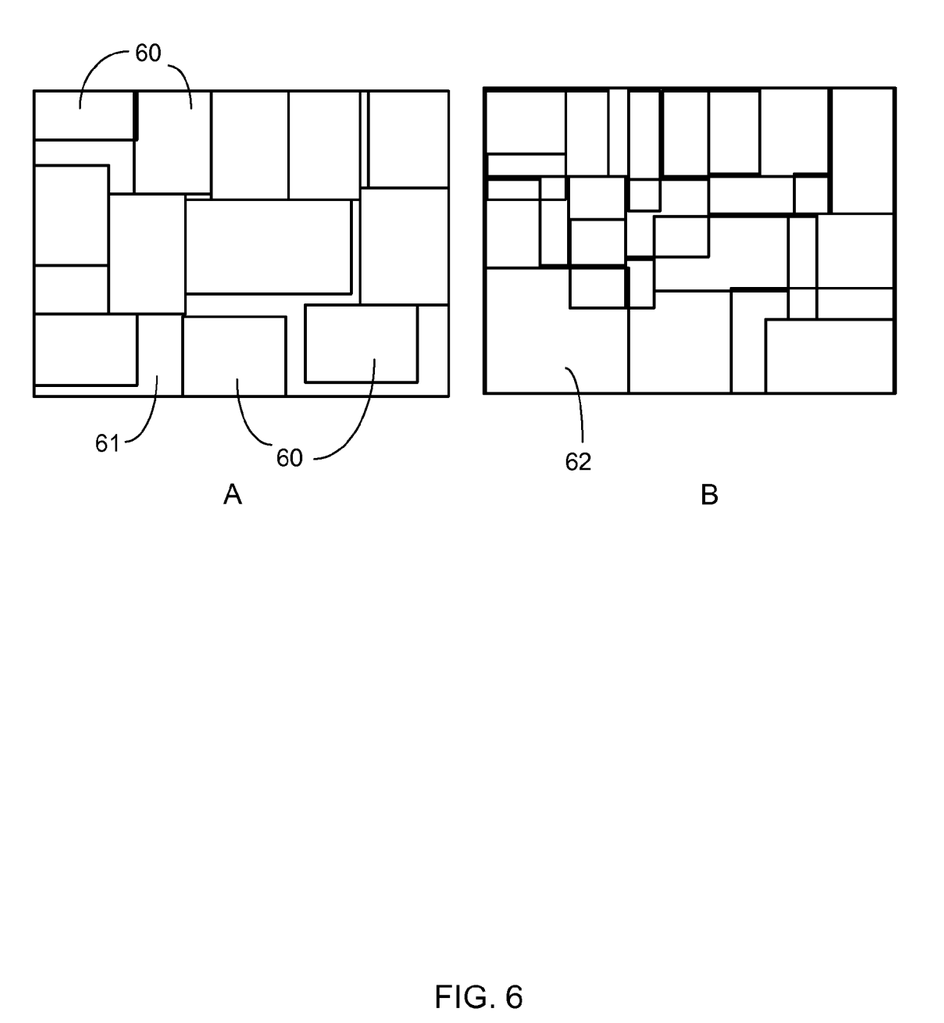
FIG. 6 shows an example output from a constraint propagation or constraint satisfaction process.

An illustration of the output of the whole constraint satisfaction procedure is given in FIG. 6. ROIs 60 are shown packed without overlap in image A. Here, some parts of the collage are blank pixels 61 where no ROIs are present. In image B whole input image regions 62 are shown. These do overlap and all pixels are covered in the collage.

Graph cut with alpha expansion. Graph cut optimization need be applied only to the image variable n in each pixel-label L(p) since the shift s for each image is now fixed. In practice, up to four values of n need to be considered at each p so alpha-expansion is used as defined in Boykov, Y Veksler, O and Zabih, R, 2001 "Fast approximate energy minimization via graph cuts", IEEE Trans on Pattern Analysis and Machine Intelligence 23, 11. Here the objective function to be minimized is that part of the energy E in (1) that is still "in play", namely $w_{imp}E_{imp}(L)+w_{trans}E_{trans}(L)+w_{obj}E_{obj}(L)$. The first of these terms is unary and the second and third are binary. Since this energy can be shown to be non-metric, the truncated schema of alpha-expansion is used, as explained in our earlier patent documents referenced above. At each iteration of alpha-expansion, the 4-connectedness property is encouraged by dilating the optimally expanded set by one pixel.

As illustrated in of FIG. 4 a blending process 44 is carried out to create a seamless transition between input images that are adjacent in the collage. Any suitable image blending process can be used. An option is to use Poisson blending such as described in Perez, P., Gagnet, M., and Blake, A. 2003 "Poisson image editing." ACM Trans. Graph. 22, 3, 313-318 or an extension of Poisson blending including edge-sensitivity as described in Agarwala, A. et. al. 2004 "Interactive digital photomontage". ACM Trans. Graph. 23, 3, 294-302.

In one embodiment we use an edge-sensitive blending in an α channel rather than in image color channels. This is done by computing an alpha mask for each individual input image. In a first step, for a particular image $I_k$ an overlap area is computed which comprises of all pixels p where the set of labels L(p), which is the same as for the preceding graph-cut optimization, includes label $I_k$ and at least one other label. Then the following functional minimizes over the overlap area $$F(\alpha)=\int \|u(r)-\alpha(r)\|^2+w(r)\|\nabla\alpha\|^2 dr, \quad (9)$$

where $$w(r) = \lambda + \beta\exp-\frac{1}{2g^2}\max_n \|\nabla I_n\|$$

is taken over the images $I_n$ present in the overlap. Normalizing constant $g^2$ is a mean-square gradient, and we set λ=20, β=10. The function u(r) takes the value 1 at a pixel p if the image label, given by graph-cut, is $I_k$ and 0 otherwise. This selection then biases α towards the graph-cut solution. Maximization of the functional F is subject to boundary conditions that α=0,1 over the overlap area, and is computed by solving a Poisson equation. In a final step each image alpha mask is normalized so that at each pixel p in the output domain the sum of all defined alpha masks is one. As a result, both sharp abutments and transparent blends are achieved automatically in a collage.

Using this edge-sensitive blending process in the α channel we are able to create seams between input images which switch automatically between cutting along natural boundaries or blending transparently, according to the presence or absence of underlying sharp edges.

In other embodiments it is possible to take user input preference information into account. FIG. 1 indicates that user input 12 may be available. For example, a user interface is provided that enables the user to specify specific constraints such as selecting particular images to be used for creating the collage. These user specified constraints are then taken into account (box 24 of FIG. 2) during the optimization process. In addition, the user interface may allow the user to move, re-size and swap input images and to select specific image parts for inclusion in the collage.

Figure 7:
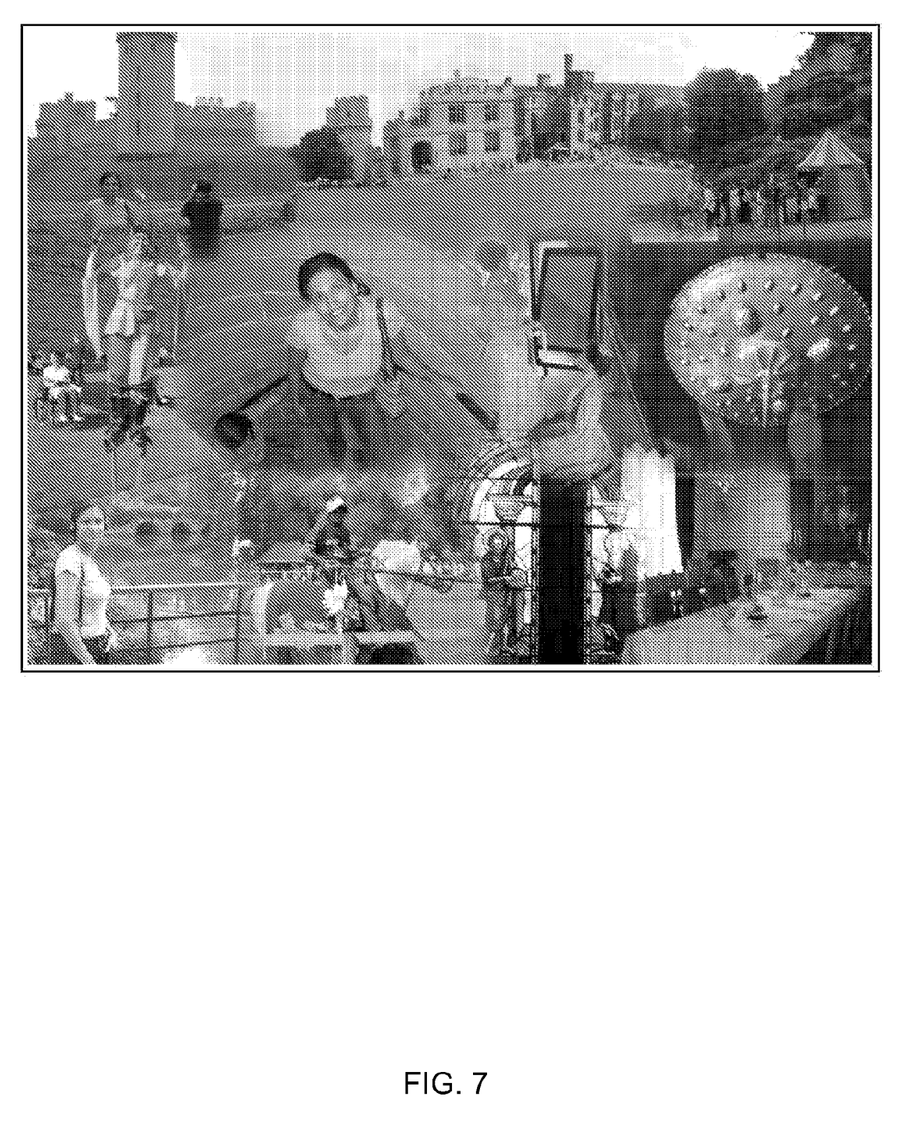
FIG. 7 is an example of a collage produced using the system of FIG. 1.

FIG. 7 is an example of a collage produced using the system of FIG. 1. It can be seen that boundaries between blended image regions are hidden, there is little duplication of material from input images, few small uninformative fragments occur and selective transparency on the seams is provided.

The methods described herein may be performed by software in machine readable form on a storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. It will further be understood that reference to 'an' item refer to one or more of those items.

The steps of the methods described herein may be carried out in any suitable order, or simultaneously where appropriate.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:
1. A method comprising:
   (i) receiving a plurality of input images from which it is required to automatically form a collage;
   (ii) specifying formation of the collage from the input images as a labeling problem;
   (iii) forming an energy function for the labeling problem, that energy function comprising a plurality of terms each relating to one or more criteria to be used in forming the collage;
   (iv) specifying one or more constraints to be applied to the energy function;
   (v) using a multi-stage optimization process to optimize the energy function taking into account the specified constraints such that at least one possible labeling is found for the collage;
   (vi) using the labeling found for the collage to form the collage using an image blending process and outputting the collage.

2. A method as claimed in claim 1 wherein the multi-stage optimization process comprises:
   selecting a region of interest for each input image; and
   applying an optimization process in order to pack as many of the regions of interest as possible within a width and height of the collage provided that as many collage pixels as possible are covered by some input image and provided that as few of the regions of interest as possible overlap in the collage.

3. A method as claimed in claim 2 wherein the multi-stage optimization process comprises a constraint satisfaction process.

4. A method as claimed in claim 1 wherein the multi-stage optimization process comprises ranking the input images on the basis of textural information in those images and an indication of similarity of the images.

5. A method as claimed in claim 1 wherein the multi-stage optimization process comprises selecting a region of interest for each input image.

6. A method as claimed in claim 3 wherein the constraint satisfaction process of the multi-stage optimization process comprises a branch and bound step and a local search step.

7. A method as claimed in claim 2 wherein the multi-stage optimization process further comprises, for any input image areas which overlap in the collage, applying an optimization process to fix pixel identity in those areas.

8. A method as claimed in claim 6 which further comprises applying a blending process to blend those input images packed in the collage.

9. A method as claimed in claim 1 which further comprises obtaining object class information and using the object class information during the process of forming the energy function.

10. A method as claimed in claim 5 wherein the regions of interest are selected such that, for a given image, at least a specified amount of the image information is present in the region of interest.

11. A method as claimed in claim 1 wherein specifying one or more constraints comprises specifying that a given input image may appear in the collage with only one displacement of that input image with respect to the collage.

12. A method as claimed in claim 1 wherein specifying one or more constraints comprises specifying that each plurality of collage pixels drawn from the same input image should preferably form a connected region.

13. A method comprising:
   (i) receiving a plurality of input images from which it is required to automatically form a collage;
   (ii) specifying formation of the collage from the input images as a labeling problem;
   (iii) forming an energy function for the labeling problem, that energy function comprising a plurality of terms each relating to one or more criteria to be used in forming the collage;
   (iv) specifying at least one of the terms of the energy function to relate to amounts of information available in the input images and to similarity of input images;
   (v) using an optimization process to optimize the energy function such that at least one possible labeling is found for the collage;
   (vi) using the labeling found for the collage to form the collage using an image blending process and outputting the collage.

14. A method as claimed in claim 13 which further comprises specifying another of the terms of the energy function to penalize transitions between images on the basis of a measure of mismatch across the boundary between two input images.

15. A method as claimed in claim 13 which further comprises receiving information about objects of class sky in the input images.

16. A method as claimed in claim 13 which further comprises specifying another of the terms of the energy function to take object class information into account.

17. A method as claimed in claim 16 which comprises receiving information about objects of class face and specifying the term of the energy function which takes object class information into account such that that term tends to ensure that if a face is included, it is included as a whole.

18. A method as claimed in claim 13 which further comprises specifying another of the terms of the energy function to take into account a local entropy measure for regions of input images.

19. One or more device-readable media with device-executable instructions for performing a method, the method comprising:
   (i) receiving a plurality of input images from which it is required to automatically form a collage;
   (ii) specifying formation of the collage from the input images as a labeling problem;
   (iii) forming an energy function for the labeling problem, that energy function comprising a plurality of terms each relating to one or more criteria to be used in forming the collage;
   (iv) specifying one or more constraints to be applied to the energy function;
   (v) using a multi-stage optimization process to optimize the energy function taking into account the specified constraints such that at least one possible labeling is found for the collage;

(vi) using the labeling found for the collage to form the collage using an image blending process and outputting the collage.

20. One or more device-readable media as claimed in claim 19 wherein the multi-stage optimization process comprises: selecting a region of interest for each input image; and applying an optimization process to pack as many of the regions of interest as possible within a width and height of the collage provided that as many collage pixels as possible are covered by some input image and provided that as few of the regions of interest as possible overlap in the collage.

* * * * *